3,444,298
METHOD FOR PREVENTING RHINOVIRUS INFECTIONS WITH 3-(3-HYDROXY-3-METHYLBUTYL-AMINO) - 5 - METHYL - 5H - AS - TRIAZINO[5,6-b] INDOLE

Charles G. Kormendy, Elkins Park, Pa., assignor to Smith Kline & French Laboratories, Philadelphia, Pa., a corporation of Pennsylvania
No Drawing. Filed July 20, 1967, Ser. No. 654,691
Int. Cl. A61k 27/00
U.S. Cl. 424—249     1 Claim

ABSTRACT OF THE DISCLOSURE

Side-chain methylated 3-hydroxypropylaminotriazinoindoles are effective in inhibiting the growth of rhinovirus. The preferred compound is 3-(3-hydroxy-3-methylbutylamino)-5-methyl-5H-as-triazino[5,6-b]indole.

---

This invention relates to methods and compositions for preventing or treating rhinovirus infections. In particular the invention consists of methods for preventing or treating rhinovirus infections with pharmaceutical compositions containing one of a selected group of hydroxy branched chain alkylaminotriazinoindole compounds and a pharmaceutical carrier.

The triazinoindole compounds which represent the active antiviral constituents of the compositions are characterized by the following structural formula:

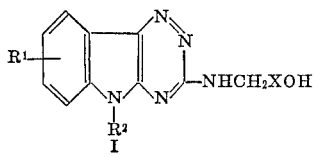

wherein
$R^1$ is hydrogen, halo, lower alkyl of 1 to 4 carbon atoms, aralkyl of 7 to 9 carbon atoms, hydroxy, lower alkoxy of 1 to 4 carbon atoms, nitro, amino, or trifluoromethyl;
$R^2$ is hydrogen, lower alkyl of 1 to 4 carbon atoms, or aralkyl of 7 to 9 carbon atoms; and

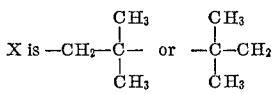

Also included within the scope of the invention are compositions containing and methods employing pharmaceutically acceptable acid addition salts of the compounds of Formula I. Among these salts are the hydrochloride, sulfate, nitrate, hydrobromide, maleate, tartrate, and benzoate. They are prepared in the conventional manner.

The compounds of Formula I are prepared by condensing an optionally substituted 3-mercapto-5H-as-triazino-[5,6-b]indole, which may be in the form of its 3-thione tautomer, with an amino alcohol of Formula II, where X is as

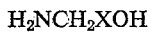

defined above. The reaction is conducted preferably at 130–180° in the absence of solvent, hydrogen sulfide evolution being a measure of the progress of the reaction. The compounds are also prepared by refluxing a 3-chloro-5H-as-triazino[5,6-b]indole with the amino alcohol in an inert solvent such as toluene. The compounds in which $R^2$ is other than hydrogen are prepared either by using as starting material a compound already having such an $R^2$ group or by treating the 3-hydroxy branched chain alkylamino product with an alkyl or aralkyl halide according to established methods. The starting 3-mercaptotriazinoindoles are disclosed in British Patent 1,023,720. The 3-chlorotriazinoindoles are prepared by treating the corresponding 3-hydroxytriazinoindoles which are disclosed in the said British patent with phosphorus oxychloride in dimethylaniline.

The compounds are formulated into compositions for use as antirhino agents by methods well known to the skilled pharmaceutical chemist. The compositions are intended to be administered orally, preferably in the form of a tablet or capsule, and can be formulated into a sustained release preparation by methods well known to the art. Another preferred mode of administration is by intranasal application, preferably in the form of a suspension or solution which is sprayed into the nasal tissues. The tablets and capsules are prepared by known methods and may include the usual pharmaceutical excipients such as sodium carboxymethyl cellulose, terra alba, sucrose, starch, lactose, and magnesium stearate. The tablets and capsules are administered in divided doses of 100 mg. to 1 g., totaling about 0.5–7 g. per day. The preferred amount is 1–5 g. per day. The intranasal formulation is best administered as a 0.5–10% suspension in the form of a spray or nose drops, several times a day.

The compositions are intended to be administered to an animal prior to rhinovirus infection in order to prevent or ameliorate the infection, or soon after infection is observed in order to treat the infection and minimize its effects. They are advantageous relative to the analogous straight chain compounds in that the methylation of the side chain serves to prevent or minimize its metabolic oxidation.

A representative tablet containing the antiviral compound 3 - (3-hydroxy-3-methylbutylamino)-5-methyl-5H-as-triazino[5,6-b]indole has the following composition:

| | Mg. |
|---|---|
| Antiviral compound | 250 |
| Terra alba | 150 |
| Sucrose, USP | 88 |
| Starch, USP | 20 |
| Magnesium stearate, USP | 5 |

A representative capsule containing the same antiviral compound has the following composition:

| | Mg. |
|---|---|
| Antiviral compound | 250 |
| Lactose | 150 |
| Magnesium stearate, USP | 6 |

A representative intranasal spray suspension containing the same antiviral compound has the following composition:

| | Percent w./v. |
|---|---|
| Antiviral compound | 5.000 |
| Sodium carboxymethyl cellulose | 1.000 |
| Sodium citrate | 0.200 |
| Potassium biphthalate | 0.130 |
| Eucalyptol, N.F. | 0.020 |
| Thimerosal, N.F. | 0.001 |
| Purified water q.s. ad | 100.000 |

Other compounds within the scope of Formula I may be substituted into the above compositions or formulated into similar compositions.

The compound 3-(3-hydroxy-3-methylbutyl)-5-methyl-5H-as-triazino[5,6-b]indole has been found to protect chimpanzees from rhinovirus infection when administered at doses of 16 mg./kg. orally three times a day.

The following examples are intended to illustrate the preparation of the compounds of the claimed compositions, but are not to be construed as limiting the scope of the invention.

Example 1.—3-(3-hydroxy-3-methylbutylamino)-5-methyl-5H-as-triazino-[5,6-b]indole A stirred solution of 35 g. (0.5 mole) of distilled methyl vinyl ketone in 300 ml. of benzene is treated dropwise over a 20 minute period with a solution of 98.6 g. (0.5 mole) of distilled dibenzylamine in 300 ml. of benzene. The mixture is allowed to stand overnight at room temperature, the benzene is evaporated in vacuo at a temperature below 45°, and the residual 4-dibenzylamino-2-butanone is recrystallized from petroleum ether (30–60°); M.P. 56.5–58°.

To a stirred solution of 110 ml. of ethereal 3 M methyl magnesium bromide in 300 ml. of ether is added over a 25 min. period a solution of 26.7 g. (0.1 mole) of the above amino ketone in 100 ml. of ether. The mixture is refluxed on the steam bath for 2 hours, kept at room temperature overnight, and 200 ml. of 2 N $Na_2CO_3$ solution added over a 45–50 minute period with stirring and cooling. The ethereal layer is separated, dried, and evaporated to give 4-dibenzylamino-2-methyl-2-butanol.

A 14.15 g. (.05 mole) sample of the dibenzylamino alcohol in ethanol is hydrogenated at 1000 p.s.i. and 100° for 4 hours using a 10% palladium on charcoal catalyst. The catalyst is filtered off and the alcohol distilled off at atmospheric pressure. The residue is dissolved in a small volume of ether, filtered, the ether evaporated in vacuo, and the residue distilled at 77–78°/15 mm. through a short microwave Vigreux column to give 4-amino-2-methyl-2-butanol, $n_D^{25}$ 1.4494.

A stirred mixture of 2.18 g. (0.01 mole) of 3-chloro-5-methyl-5H-as-triazino[5,6-b]indole, 2.58 g. (0.025 mole) of 4-amino-2-methyl-2-butanol, and 20 ml. of toluene is heated at reflux for 45 minutes, after which an additional 0.25 g. (0.0024 mole) of the amino alcohol is added and refluxing continued for an additional 45 minutes. The toluene is evaporated in vacuo and the residue triturated with water. The resulting crude product is recrystallized from isopropanol to give the title compound, M.P. 190–191.5°.

Alternate procedure:

A mixture of 2.1 g. (0.00972 mole) of 3-mercapto-5-methyl-5H-as-triazino[5,6-b]indole and 3.2 g. (0.031 mole) of 4-amino-2-methyl-2-butanol is heated in an oil bath at 160–170° for 45 minutes and then stirred at 175–180° for 4 hours. The mixture is kept at room temperature overnight, triturated with ca. 25 ml. of water, and the resulting solid recrystallized to give the title product, M.P. 188–190°.

Example 2.—3-(3-hydroxy-2,2-dimethylpropylamino)-5-methyl-5H-as-triazino[5,6-b]indole To a cooled, stirred solution of 200 g. (2.8 moles) of isobutyraldehyde and 224 g. of 37% formalin is added in small portions 160 g. of solid $K_2CO_3$. The mixture is stirred at room temperature for a period of 1 hour after the completion of the addition, extracted with ether (ca. 1–1.5 liters), and the ether extracts are dried and evaporated to give 3-hydroxy-2,2-dimethylpropionaldehyde.

To a solution of 330 g. of the crude aldehyde in 600 ml. of alcohol is added 100 g. of liquid ammonia and 60 g. of Raney Ni. This mixture is hydrogenated for 2 hours at 1000 p.s.i. The catalyst is filtered off, the solvent evaporated, and the resulting liquid distilled in vacuo through a 6″ silvered Vigreux column to give 3-amino-2,2-dimethylpropanol.

A mixture of 10.9 g. (0.05 mole) of 3-chloro-5-methyl-5H-as-triazino[5,6-b]indole, 15.5 g. (0.15 mole) of the above amino alcohol, and 150 ml. of toluene is refluxed for 1.5 hours. The solid which forms is filtered off, washed with 100 ml. of water, and dried to give a crude product, which is recrystallized from 750 ml. of isopropanol to give the title product, M.P. 226–227°.

Condensation of the above amino alcohol with the 3-mercapto compound also results in the formation of the title product.

3-chloro-5-methyl-5H-as-triazino[5,6-b]indole

A mixture of 12.4 g. (0.062 mole) of 3-hydroxy-5-methyl-5H-as-triazino[5,6-b]indole, 50 ml. of $POCl_3$, and 25 ml. of N,N-dimethylaniline is refluxed for one-half hour. The mixture is allowed to cool and then cautiously poured onto cracked ice. The solid is filtered off, washed, and dried, and then recrystallized from alcohol to give the title compound, M.P. 218–219°.

I claim:

1. A method for preventing or treating rhinovirus infections comprising administering to an animal an effective amount of 3-(3-hydroxy-3-methylbutylamino)-5-methyl-5H-as-triazino[5,6-b]indole or a pharmaceutically acceptable acid addition salt thereof and a pharmaceutical carrier.

References Cited

FOREIGN PATENTS 1,023,720  3/1966  Great Britain.

ALBERT T. MEYERS, *Primary Examiner.*

J. GOLDBERG, *Assistant Examiner.*